(12) United States Patent
Fukuchi et al.

(10) Patent No.: US 8,190,351 B2
(45) Date of Patent: May 29, 2012

(54) DIAGNOSTIC CONTROL APPARATUS FOR INTERNAL COMBUSTION ENGINES

(75) Inventors: Eisaku Fukuchi, Mito (JP); Akihito Numata, Hitachiomiya (JP); Heikichi Kamoshita, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 616 days.

(21) Appl. No.: 12/470,204

(22) Filed: May 21, 2009

(65) Prior Publication Data

US 2010/0017098 A1    Jan. 21, 2010

(30) Foreign Application Priority Data

Jul. 18, 2008 (JP) ................................. 2008-187496

(51) Int. Cl.
- G06F 19/00 (2011.01)
- G21C 17/06 (2006.01)
- F02D 41/14 (2006.01)
- F02D 41/16 (2006.01)

(52) U.S. Cl. ........ 701/114; 701/104; 701/109; 701/111; 702/185

(58) Field of Classification Search ............. 123/339.11, 123/339.12, 339.14, 406.18, 406.2, 406.23, 123/406.24, 406.47, 406.58, 435, 436, 479, 123/673; 701/101–105, 109–111, 114, 115; 73/114.03, 114.04, 114.06, 114.11, 114.13–114.17, 73/114.22, 114.25–114.29; 702/182, 183, 702/185, 187

See application file for complete search history.

(56) References Cited

U.S. PATENT DOCUMENTS

| | | | | |
|---|---|---|---|---|
| 5,197,325 A | * | 3/1993 | Tamura et al. | 73/114.03 |
| 5,268,843 A | * | 12/1993 | Imai | 701/111 |
| 6,152,105 A | * | 11/2000 | Nishimura et al. | 701/111 |
| 6,907,341 B2 | * | 6/2005 | Aono et al. | 701/111 |
| 7,069,142 B2 | * | 6/2006 | Keller et al. | 701/114 |
| 7,179,197 B2 | * | 2/2007 | Asano et al. | 123/436 |

FOREIGN PATENT DOCUMENTS

| | | |
|---|---|---|
| JP | 4-311631 A | 11/1992 |
| JP | 2006-002628 A | 1/2006 |
| JP | 2007-071183 A | 3/2007 |
| JP | 2007-255230 A | 10/2007 |

OTHER PUBLICATIONS

Japanese Office Action dated Jul. 26, 2011 (3 pages) and English language translation thereof (4 pages).

* cited by examiner

*Primary Examiner* — Willis Wolfe, Jr.
(74) *Attorney, Agent, or Firm* — Crowell & Moring LLP

(57) ABSTRACT

Disclosed is a diagnostic control apparatus for internal combustion engines capable of accurately diagnosing the presence and extent of air/fuel ratio variations in engine cylinders, even when the system has no part for detecting the air/fuel ratio in each cylinder. The diagnostic control apparatus measures the time required for the crankshaft to rotate to a specified angle for each cylinder; and based on this measured, required time, derives the 0.5 order component as the rotation fluctuation component for each two rotations of the crankshaft per each cylinder or the 1.0 order component as the rotation fluctuation component for each single rotation of the crankshaft; and also counts the number of times the 0.5 order component or 1.0 order component deviates from the preset range in the period set for each cylinder, and diagnoses an error in the output or in the air/fuel ratio for a particular cylinder when that count value exceeds a specified value.

15 Claims, 15 Drawing Sheets

DURRING NORMAL OPERTION

WHEN FUEL INJECTION QUANTITY TO #5 CYLINDER WAS INCREASED 40%

WHEN FUEL INJECTION QUANTITY TO #5 CYLINDER WAS DECREASED 20%

DIFFERENCE IN 0.5 ORDER COMPONENT

DIFFERENCE IN 1.0 ORDER COMPONENT

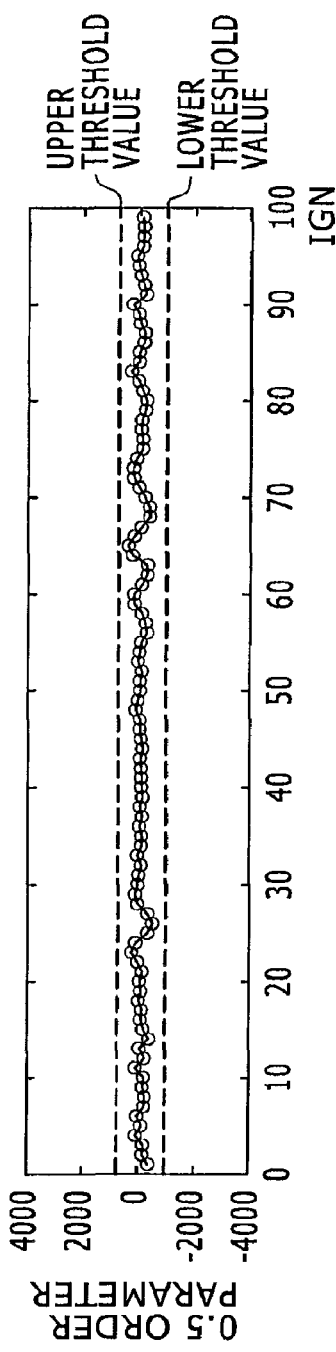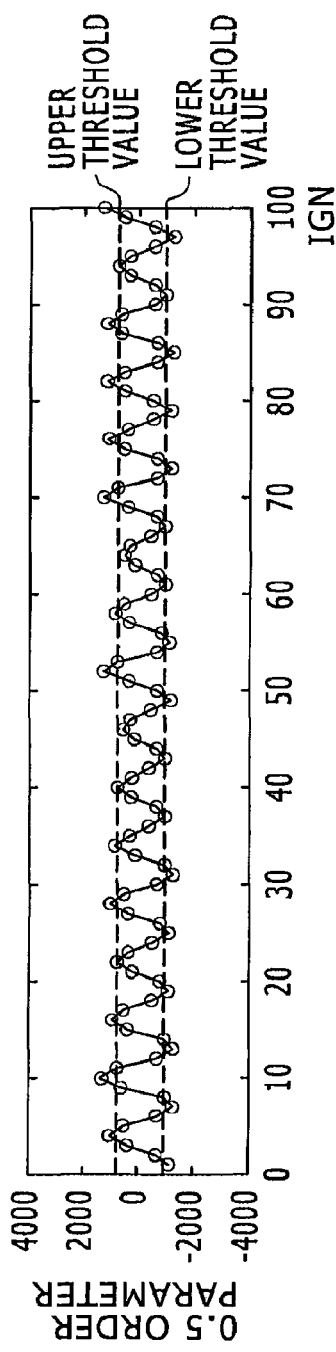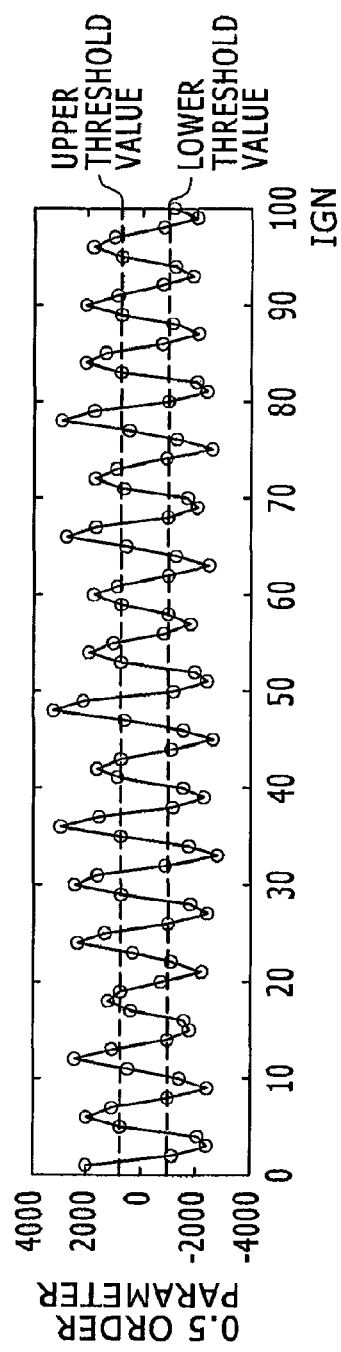

DIAGNOSTIC CONTROL APPARATUS FOR INTERNAL COMBUSTION ENGINES

FIELD OF THE INVENTION

This invention relates to a diagnostic control apparatus for internal combustion engines, such as a diagnostic control apparatus for diagnosing the presence or extent of variations in the output or air/fuel ratio in cylinders in multi-cylinder internal combustion engines in vehicles.

BACKGROUND OF THE INVENTION

Recently, OBD (Onboard Diagnostics) systems that detect and display deterioration and breakdowns occurring in vehicle components are coming into general use with the main objective of preventing destruction of the environment by air pollution and also to comply with exhaust gas restrictions on vehicles with internal combustion engines. Besides detecting and monitoring problems (unexpected breakdowns) in devices for processing exhaust gas and informing the driver via a warning display when a problem occurs, OBD systems also store details of the breakdown or failure in a memory. The installation of simple OBD systems that sense broken wires and disconnection in electrical circuits for each sensor is currently required by law. However, ever tougher exhaust gas restrictions and advanced technology for reducing or cleaning exhaust gas will require installation of sophisticated OBD systems capable of detecting vehicle exhaust gas levels from various sensor information and reliably detecting breakdowns in their early stages.

Under these circumstances, efforts were made to develop OBD systems for example for diagnosing the presence and extent of variations in the air/fuel ratio in cylinders in vehicles with multi-cylinder internal combustion engines. However diagnosing variations in the air/fuel ratio in cylinders in multi-cylinder internal combustion engines required installing an air/fuel ratio detector part (air/fuel ratio sensor) in each cylinder. Installing an air/fuel detector part in each cylinder causes higher costs so a number of technologies were proposed for estimating the air/fuel ratio in each cylinder by using just one air/fuel ratio detector part. However, virtually none of the proposed technology of the conventional art provided the required diagnostic accuracy and was not at a level allowing mass production. This proposed technology was therefore incapable of estimating the air/fuel ratio in each cylinder and accurately diagnosing variations or the extent of variations in engine cylinders.

Here, the expression, "variations in air/fuel ratio in cylinders" indicates a state where there is a large deviation in the rich state or lean state of the air/fuel ratio for one or multiple cylinders relative to the average air/fuel ratio for all cylinders.

A diagnostic control apparatus for internal combustion engines and relating to OBD systems is disclosed in JP-A No. 2007-255230. This device operates fuel injection valves installed in cylinders of internal combustion engines with multiple cylinders by using feedback to control the rotation speed of the output shaft to a target value; and also contains a diagnostic part to diagnose whether a problem has occurred in any of the fuel injection-valves based on increased fluctuations in output shaft rotations.

SUMMARY OF THE INVENTION

In systems of the conventional art with no part for detecting the air/fuel ratio in each cylinder, accurately diagnosing whether there were air/fuel ratio variations in the cylinders and the extent of those variations as described above was extremely difficult. Moreover, regardless of the air/fuel ratio, accurately diagnosing the output of the cylinders or in other words, the presence and extent of variations in the valve timing, valve lift amount, and compression ratio was also extremely difficult.

To resolve the problems of the conventional art, this invention has the object of providing a diagnostic control apparatus for internal combustion engines capable of accurately diagnosing the presence and extent of air/fuel ratio variations in engine cylinders, even in systems possessing no part for detecting the air/fuel ratio in each cylinder.

In order to achieve the above objects, the diagnostic control apparatus for internal combustion engines of this invention is basically a device of capable of diagnosing the presence and extent of variations in the output or the air/fuel ratio in the cylinder as well as controlling the fuel injection quantity into each cylinder; and in which the diagnostic control apparatus measures the time required for the crankshaft to rotate to a specified angle for each cylinder; and along with deriving the 0.5 order component as the rotation fluctuation component for each two rotations of the crankshaft per each cylinder or the 1.0 order component as the rotation fluctuation component for each single rotation of the crankshaft based on this measured required time; also makes a count of the number of times that the 0.5 order component or 1.0 order component deviates from the preset range in the period set for each cylinder; and diagnoses that an error has occurred in the output or in the air/fuel ratio of a particular cylinder when the count exceeds a specified value.

More specifically, as shown in the drawing for the corresponding claim of FIG. 1, the diagnostic control apparatus includes: an output measurement estimator part 101 for measuring or estimating the output from each cylinder or its correlating physical quantity, a cylinder discriminator part 103 for deciding which cylinder is at what stroke, an cylinder variation parameter processor part 102 for processing variation parameters in the cylinders based on the output from each cylinder or its correlating physical quantity as measured and estimated by the output measurement estimator part 101, a cylinder variation counter processor approval decision part 104 for deciding whether or not to approve the cylinder variation counter processing, an cylinder. variation counter processor part 105 for processing the cylinder variation counter based on the decision results of the cylinder discriminator part 103 and processing results from the cylinder variation parameter processor part 102 and decision results from the cylinder variation counter processor approval decision part 104, a cylinder variation decision approval part 106 for deciding whether or not to approve the cylinder variation decision; and a cylinder variation detector decision part 107 for detecting and deciding the presence and extent of variations in output or the air/fuel ratio in the cylinders based on processing results from the cylinder variation counter processor part 105, as well as decision results from the cylinder variation decision approval part 106.

The output measurement estimator part 101 measures the time required for the crankshaft to rotate to a specified angle at each cylinder preferably as a physical quantity correlating to the output, and estimates each cylinder's output based on this required time that was measured.

The cylinder discriminator part 103 decides which cylinder is at the ignition-combustion stroke, preferably based on the signal obtained from the sensor for detecting the rotation and phase of the crankshaft and/or rotation member that rotates in synchronization with the crankshaft.

The cylinder variation parameter processor part 102 preferably detects the 0.5 order component as the rotation fluctuation component for each two rotations of the crankshaft or the 1.0 order component as the rotation fluctuation component for each single rotation of the crankshaft, based on the required time measured by the output measurement estimator part 101.

The cylinder variation counter processor part 105 sets the upper threshold value and the lower threshold value preferably for the 0.5 order component, and also counts the number of times that the 0.5 order component exceeded the upper threshold value or dropped below the lower threshold value, in compliance with decision results from the cylinder discriminator part 103.

The cylinder variation counter processor part 105 sets the upper threshold value and the lower threshold value preferably for the 1.0 order component, and also counts the number of times that the 1.0 order component exceeded the upper threshold value or dropped below the lower threshold value, in compliance with decision results from the cylinder discriminator part 103.

The cylinder variation counter processor part 105 preferably sets the upper threshold and lower threshold values based on the engine rotation (rpm) and the load.

The cylinder variation counter processor approval decision part 104 preferably approves the counter processing-when: the engine rotations (rpm) are within the specified range, the load is within the specified range, the engine cooling fluid temperature is within the specified range, the vehicle speed is within the specified range, the air intake (or inlet) temperature is within the specified range, the atmospheric pressure is the specified value or higher, the battery voltage is within the specified range, the non-fuel cutoff state is set, the air/fuel ratio feedback control is in-progress, the air/fuel ratio correction factor is within the specified range, the canister purge quantity is the specified value or lower, no fluctuations are occurring in the external electrical load, and the sensor is not broken.

The cylinder variation counter processor approval decision part 104 preferably approves the counter processing when (the engine is) in the idle state.

The cylinder variation decision approval part 106 measures the ignition combustion count or the elapsed time in the period where the cylinder variation counter processor approval decision part 104 has approved the processing.

The cylinder variation detector decision part 107 preferably decides there is an error in the output or the air/fuel ratio of the cylinders, when the count value for each cylinder counted by the cylinder variation counter processing part has become larger than the specified value; when the ignition combustion count reached specified value, or when the elapsed time reached specified time.

However, in another aspect of this invention for a diagnostic control apparatus for internal combustion engines of this invention, that not only controls the fuel injection quantity injected to each cylinder, but also diagnoses the presence and extent of variations in at least one among the valve timing, valve lift quantity and compression ratio of the cylinders; the diagnostic control apparatus measures the time required for the crankshaft to rotate to a specified angle for each cylinder; and along with deriving the 0.5 order component as the rotation fluctuation component for each two rotations of the crankshaft per each cylinder or the 1.0 order component as the rotation fluctuation component for each single rotation of the crankshaft based on this measured, required time; also makes a count of the number of times that the 0.5 order component or 1.0 order component deviates from the preset range in the period set for each cylinder; and when the count value exceeds a specified value, diagnoses that at least one error has occurred among the valve timing, valve lift quantity and compression ratio for that cylinder.

This invention is capable of accurately diagnosing the presence and extent of air/fuel ratio variations or other factors in the engine cylinders, even when there is no system for detecting the air/fuel ratio in each cylinder, and consequently speeds up the spread and usage of OBD systems, and improves operability and exhaust performance (exhaust emission characteristics).

BRIEF DESCRIPTION OF THE DRAWINGS

FIG. 5 is drawings showing the 0.5 order parameters;

DETAILED DESCRIPTION OF THE PREFERRED EMBODIMENTS

Figure 1:
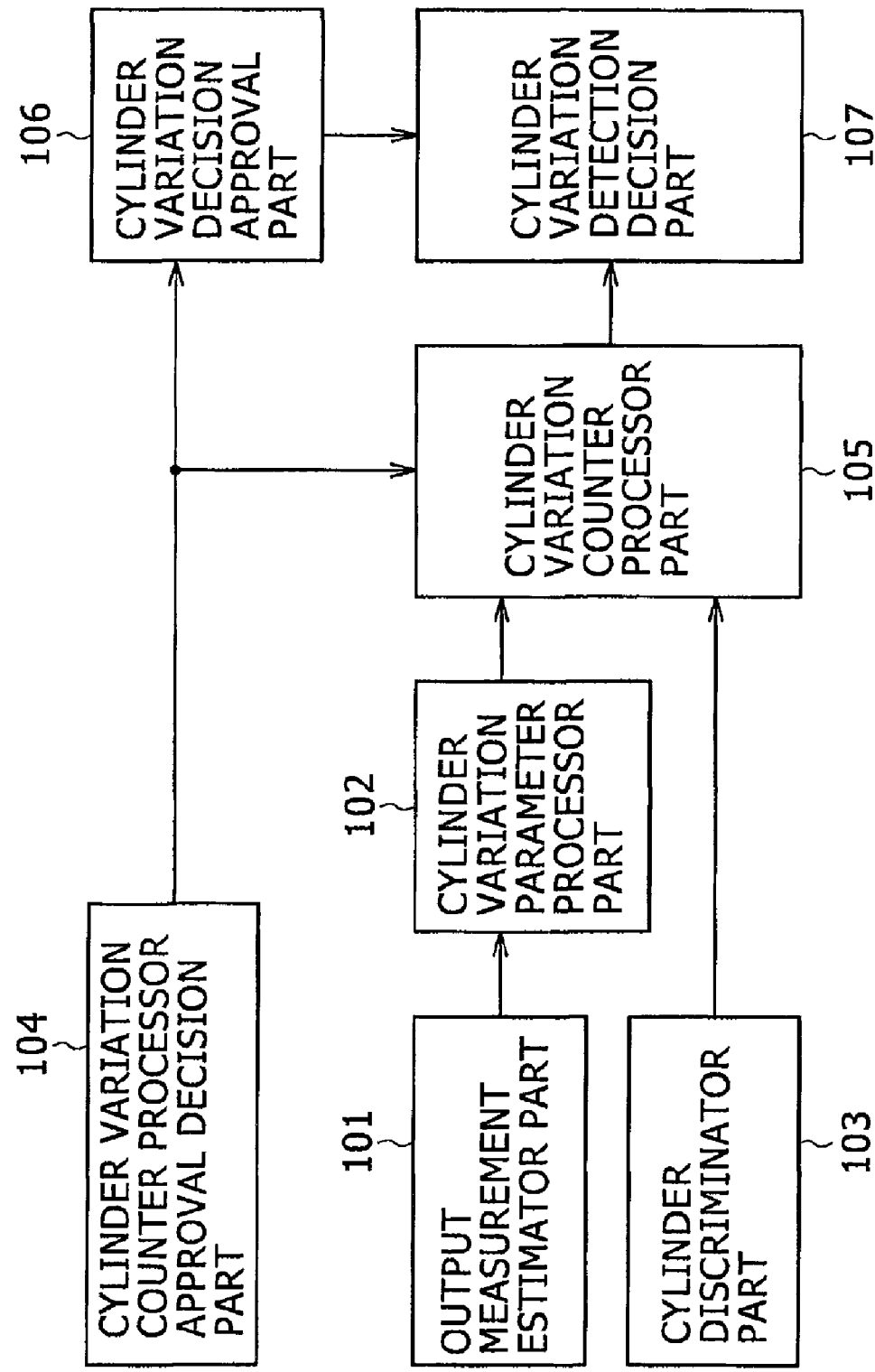
FIG. 1 is a block diagram corresponding to claim 2 in the range of the patent claims.

The embodiments of the diagnostic control apparatus for internal combustion engines of this invention are described next while referring to the drawings.

Figure 2:
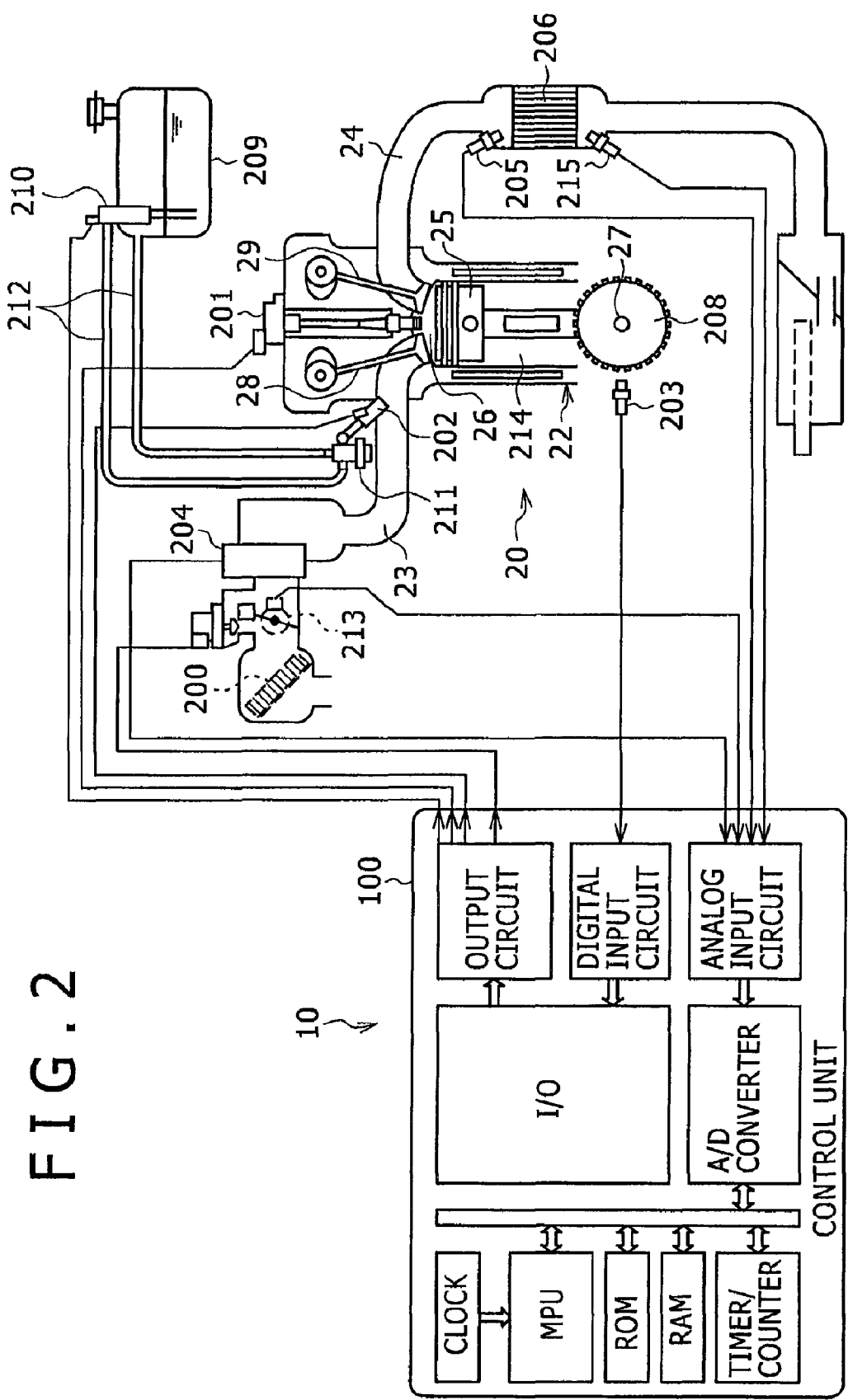
FIG. 2 is an overall view showing one example of the first embodiment of the diagnostic control apparatus of this invention applied to a vehicular internal combustion engine.

FIG. 2 is an overall view showing one example of the first embodiment of the diagnostic control apparatus of this invention applied to a vehicular internal combustion engine.

The internal combustion engine 20 of the embodiment shown in the figure is a multi-cylinder combustion engine with six cylinders (#1, #2, #3, #4, #5, #6) and for example using gasoline as fuel (Drawing shows only one cylinder). The engine 20 includes a cylinder 22 made up of a cylinder block and cylinder head, a piston 25 inserted for sliding movement within the cylinder 22, an air intake valve 28 in a combustion chamber 26 formed above the piston 25, and an air intake passage 23, and exhaust passage 24 connected by way of the exhaust valve 29.

The air intake passage 23 contains an air cleaner 200, an air flow sensor 204 to measure the air intake quantity, an electrically-controlled throttle valve 213 to adjust the air intake quantity flowing into the combustion chamber 26, and a fuel injection valve 202, etc. An ignition device 201 including a spark plug to supply the spark energy is installed in the center of the roof section of the combustion chamber 26.

After the throttle valve 213 adjusts the flow rate of air suctioned in from the air cleaner 200, the flow rate of air is measured by the air flow sensor 204, mixed with fuel injected from the fuel injection valve 202 at a specified angle, and then supplied to the combustion chamber 26 of each cylinder 214.

A three-way catalyst 206, an air/fuel ratio sensor 205 for detecting the air/fuel ratio of exhaust gas upstream of the three-way catalyst 206, and an air/fuel ratio sensor 215 for detecting the air/fuel ratio of exhaust gas flowing downstream of the three-way catalyst 206 are installed along the exhaust passage 24.

The fuel pump 210 suctions and pressurizes the fuel inside the fuel tank 209, and the fuel is then fed by way of the fuel pipe 212 containing a pressure regulator 211 into the fuel inlet of the fuel injection valve 202, and excess fuel is returned to the fuel tank 209.

In addition to the above, a control unit 100 serving as the core section of the diagnostic control apparatus 10 of this embodiment is installed for controlling the spark period of the ignition device 201 and the fuel injection by the fuel injection valve 202. The internal structure of the control unit 100 is well known so a description is omitted here. This control unit 100 calculates each cylinder's fuel injection quantity Ti based on the signal (intake air quantity Qa) from the air flow sensor 204, and the signal (the number of machine rotations Ne) from the crank angle sensor 203, and supplies a drive pulse signal having a pulse width matching that fuel injection quantity Ti to the fuel injection valve 202. The control unit 100 then executes air/fuel ratio feedback control so that the air/fuel ratio within the engine reaches a theoretical air/fuel ratio.

The diagnostic control apparatus 10 of internal combustion engine 20 of this embodiment possessing the above structure, diagnoses the presence and extent of air/fuel variations in the cylinders. More specifically, the diagnostic control apparatus 10 measures the time required for the crankshaft 27 to rotate to the specified angle for each cylinder, and along with deriving the 0.5 order component as the rotation fluctuation component for each two rotations of the crankshaft per each cylinder or the 1.0 order component as the rotation fluctuation component for each single rotation of the crankshaft based on this measured, required time; also makes a count of the number of times that the 0.5 order component or 1.0 order component deviates from the preset range in the period set for each cylinder; and diagnoses that an error has occurred in the output or in the air/fuel ratio for a particular cylinder when the count exceeds a specified value.

The diagnosis operation is next described in detail.

Figure 3A:
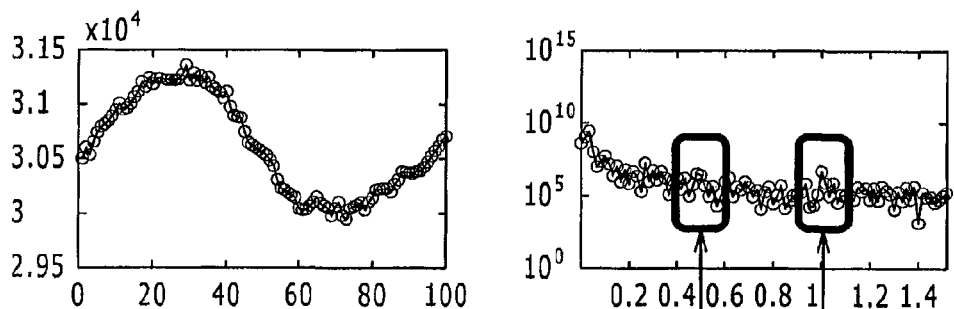
FIG. 3 is graphs showing the time signal and its frequency spectrum when the fuel injection quantity is increased and decreased.
Figure 3B:
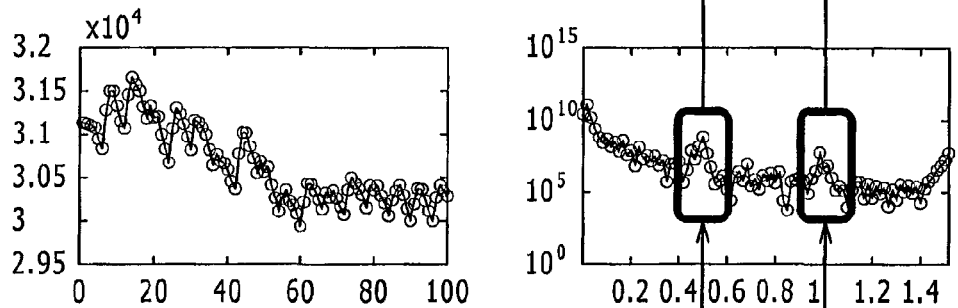
Figure 3C:
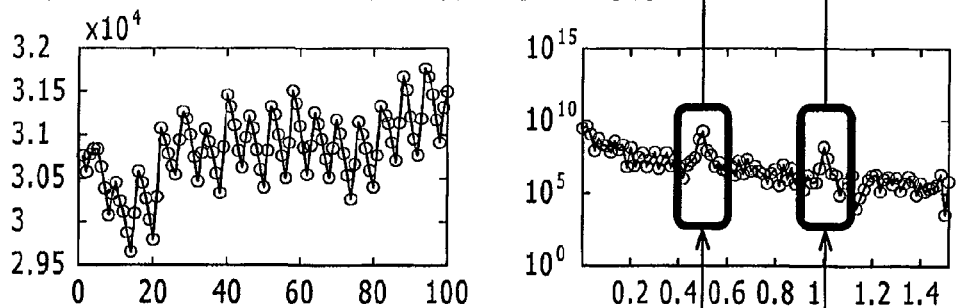

FIG. 3 shows the result (frequency spectrum) derived as the 0.5 order component which is the rotation fluctuation component for each two rotations of the crankshaft per each cylinder, and the 1.0 order component which is the rotation fluctuation component for each single rotation of the crankshaft, based on the required time (time signal) found from measuring the time required for the crankshaft 27 to reach the specified rotation angle at each cylinder. In the figure, (a) is data for normal operation, and (b) is the data when the fuel injection quantity to the #5 cylinder was increased 40 percent, and (c) is the data when the fuel injection quantity for the #5 cylinder was decreased by 20 percent. Quantitatively assessing the difference just by viewing the time signal is difficult, but examining the frequency spectrum shows the differences in the 0.5 order component or 1.0 order component. The example in this embodiment utilized the #5 cylinder but the same effect is obtained in the other cylinders even if the fuel injection quantity is increased or decreased.

Here, an NG state indicates a state where variations in the air/fuel ratio occur and the exhaust gas exceeds the defined value, from increasing or decreasing the fuel injection amount in a specified cylinder as described above. Increases and decreases in the fuel injection quantity are one cause of variations in the air/fuel ratio, however other causes are possible. In this example, the fuel injection quantity was increased or decreased in a designated cylinder to indirectly cause variations in the air/fuel ratio.

Applying a filter for deriving the 0.5 order component or 1.0 order component to the time signal allows detecting this state.

A filter is therefore designed to extract the 0.5 order component. The 1.0 order component can also be extracted and detected but errors in the manufacturing of the disk plate 208 attached to the crank shaft 27 will gradually accumulate and might make accurately detecting fluctuations in the air/fuel ratio in each cylinder impossible.

The description now proceeds based on the 0.5 order component signal. Formula (1) is the filtering formula for detecting the 0.5 order component signal.

$$ROGHNE(i)=2 \cdot TDATA(i-5)-2 \cdot TDATA(i-7)-TDATA(i-8)+TDATA(i-10)-TDATA(i-2)+TDATA(i-4) \quad (1)$$

Note that, TDATA(i): Time required for crankshaft to reach the specified rotation angle (time signal)

TDATA (i−n): TDATA prior to n ignition

ROGHNE(i): 0.5 order parameter

Figure 4:
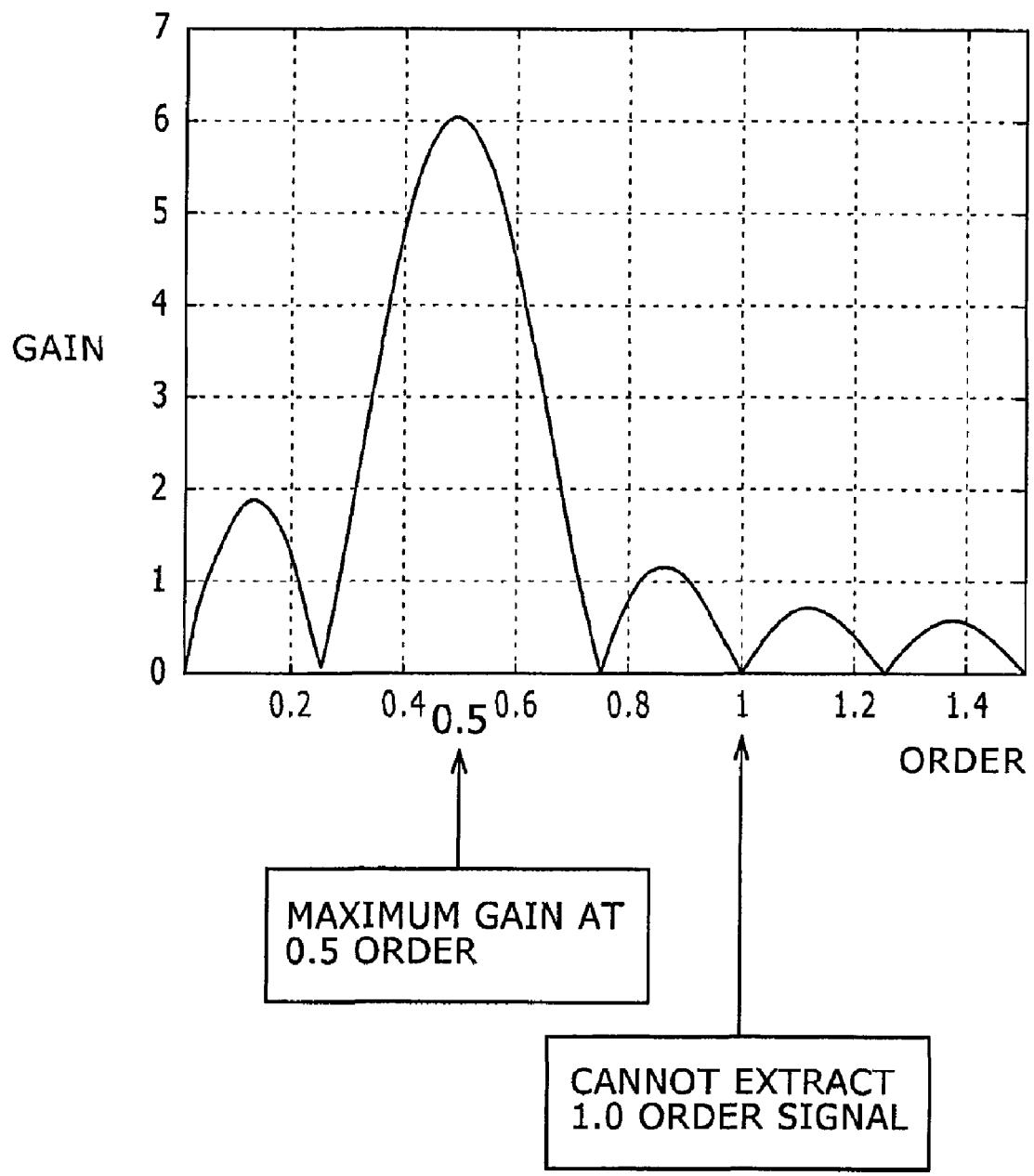
FIG. 4 is a Bode diagram (plot) of the 0.5 order component derived filter.

FIG. 4 is a Bode diagram (gain) for formula (1). As can be seen from viewing FIG. 4, the gain is a maximum at 0.5 order. This maximum gain allows detecting the 1.0 order component signal. This filter also shows a gain of 0 at the 0.5 order, so the 1.0 order component (signal) cannot be detected. As already described above, detecting the 1.0 order component signal is possible but it also includes manufacturing errors from the-time signal measurement plate so eliminating the 1.0 order component part that effects due to time signal measurement plate manufacturing errors have also been eliminated.

FIG. 5 shows the 0.5 order parameter calculated in formula (1). In the figure, (a) shows normal operation, (b) shows the case when the fuel injection quantity of the #5 cylinder has been increased 40 percent, and (c) shows the case when the fuel injection quantity of the #5 cylinder has been decreased 20 percent. Viewing the figure reveals a swing in the 0.5 order component parameter at (b) and (c) compared to (a). Fuel/air ratio variations that occur can therefore be identified when the 0.5 order parameter exceeds the upper threshold value or falls below the lower threshold value. However in view of factors such air/fuel ratio feedback control accuracy, mechanical errors in items such as sensors, deterioration over time, and variations; deciding just from one decision (judgment) that a fuel/air ratio variation occurred in a designated cylinder might lead to a wrong diagnosis.

The following two guard conditions are therefore added to avoid making the wrong diagnosis. One condition is that a decision (or judgment) is approved only when a peak was detected in a signal exceeding the upper threshold value. Even if the upper threshold value was exceeded the decision is not approved if there is no peak. This condition also holds for cases where the signal was below the lower threshold value, and a decision can only be approved when a negative peak was detected in the signal falling below the lower threshold value. Even if below the lower threshold value, the decision cannot be approved unless there is a negative peak. There is also a large positive/negative swing in the 0.5 order parameter during a misfire so decisions are prohibited when a positive misfire decision value is exceeded or when the signal fell below the negative misfire decision value.

Another condition is use of a counter method that counts multiple decisions. Here, a specified ignition (spark fire) count is set in advance, and a counter for each cylinder increments (increases) the count each time a decision is made in the period until that preset ignition count is reached. An air/fuel ratio variation for the designated cylinder whose count is larger than a specified value is then decided to have occurred when the number of ignitions has reached the specified value, and the count for each cylinder is larger than the specified value. A decision can also be made at a preset specified time.

Figure 6A:
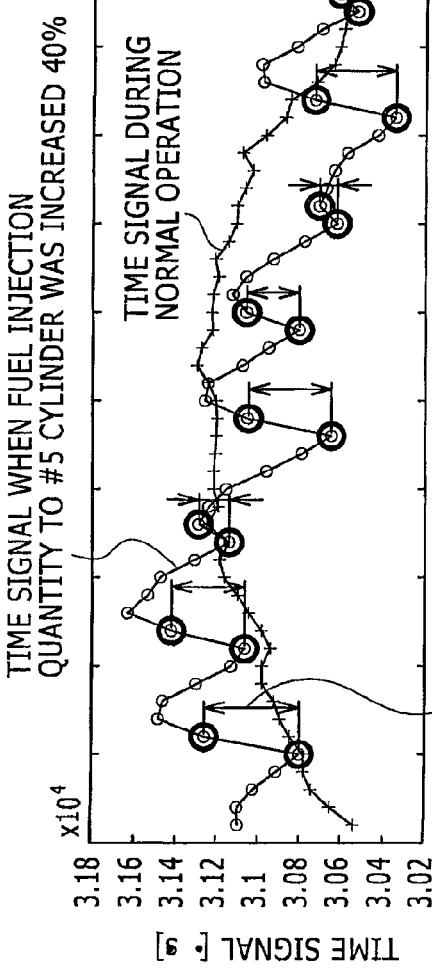
FIG. 6 is drawings showing the 0.5 order parameter and the time signal.
Figure 6B:
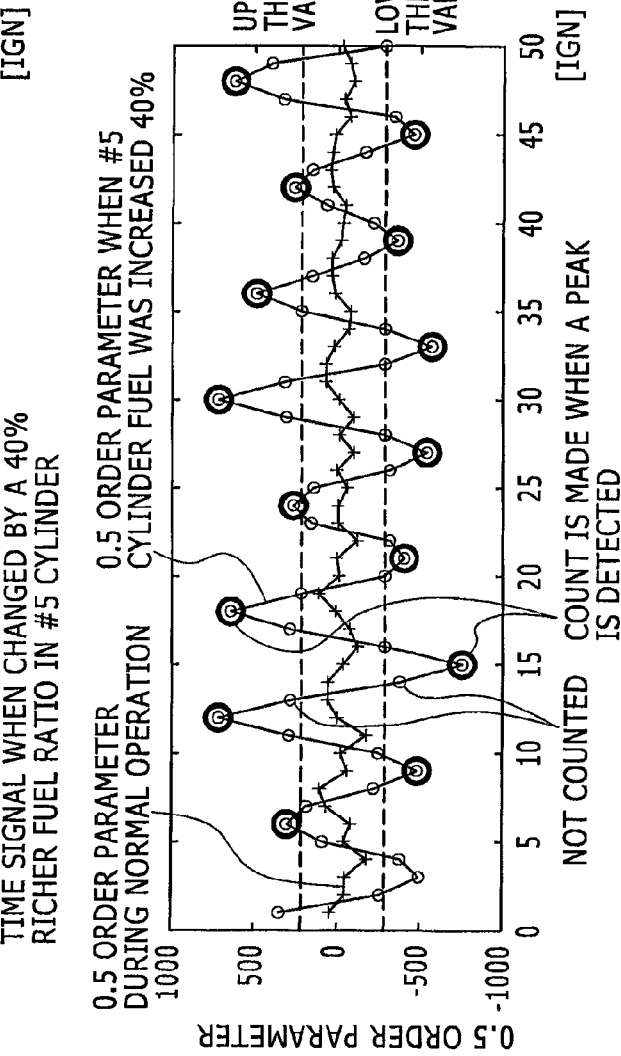

FIG. 6 shows the time signal and the 0.5 order parameter. Data for when the fuel injection quantity of the #5 cylinder was increased to 40 percent is over lapped on the normal time data. The firing cylinder is not shown in the figure for the time signal at a 40 percent fuel increase in the #5 cylinder, however the time signal has become larger at the point corresponding to the #5 cylinder. This larger time signal indicates that the cylinder balance has deteriorated, and the crankshaft rotations have slowed due to the 40 percent fuel increase. Peaks can be detected by utilizing this effect to set the upper threshold and lower threshold values for the 0.5 order parameter. As already described, detecting the peak prevents errors in the count.

Figure 7:
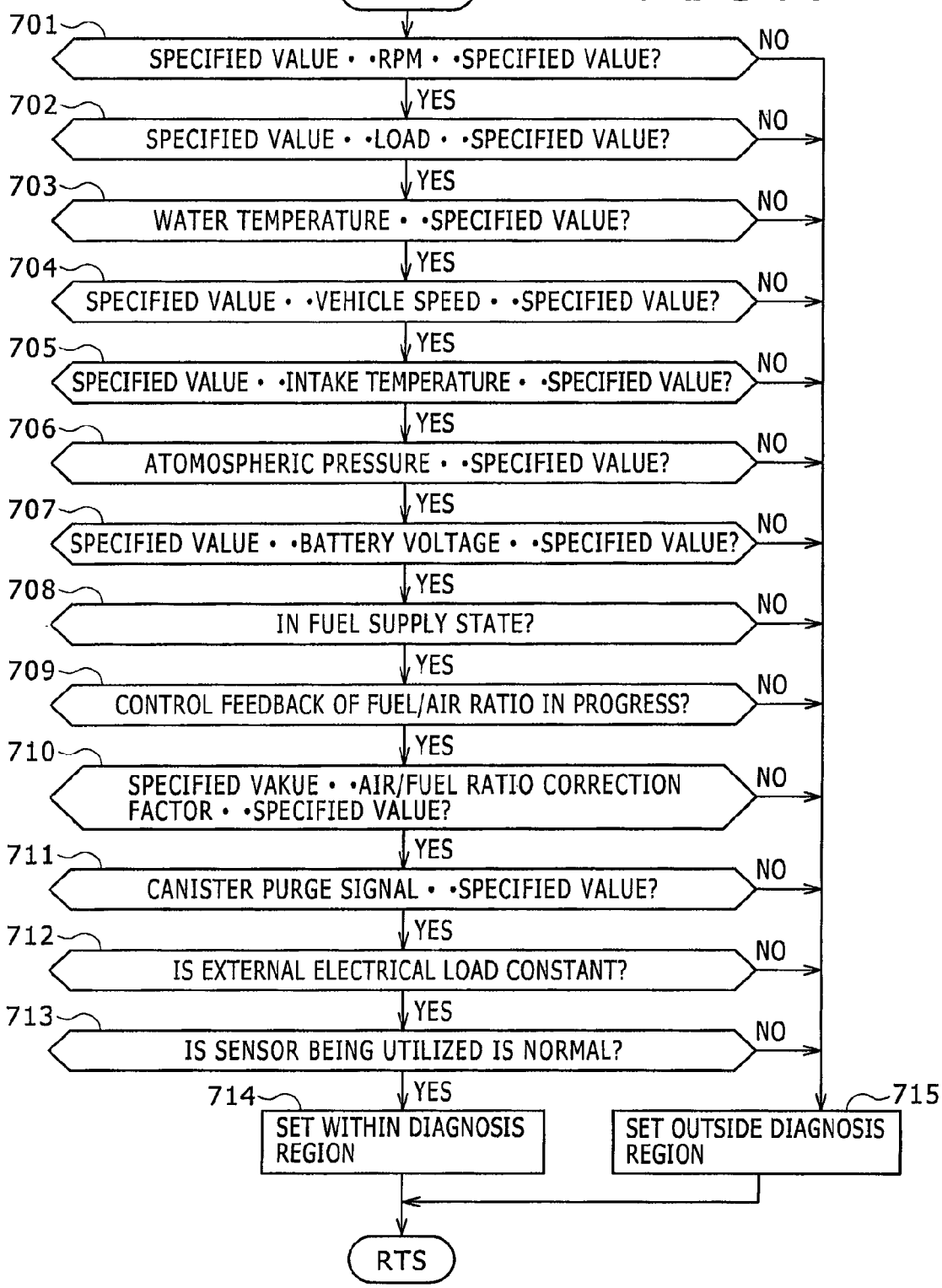
FIG. 7 is a flow chart provided to describe the diagnosis technique of this embodiment.

FIG. 7 shows a flow chart of the diagnosis region decision where the control unit 100 makes the diagnosis. Here, a check is made in step 701 to find whether the engine rpm is within the specified range. A check is made in step 702 to find whether the engine load is within the specified range. A check is made in step 703 to find if the fluid temperature is at the specified value or higher. In step 704, a check is made to find whether the vehicle speed is within the specified range. In step 705 a check is made to find if the intake air temperature is within the specified range. A check is made in step 706 to find if the atmospheric pressure is the specified value or higher. In step 707 a check is made to find whether the battery voltage is within the specified range. In step 708 a check is made to find whether the fuel has not been cut off. In step 709, a check is made of whether feedback control of the air/fuel ratio is in progress. In step 710 a check is made on whether the air/fuel ratio correction factor is within the specified range. In step 711 a check is made on whether the canister purge is the specified value or lower. In step 712, a check is made on whether there is a fluctuation in the external electrical load. In step 713, a check is made to find if the sensor being utilized is defective. In step 714, if all conditions from step 701 through 713 are satisfied then the state is judged within diagnosis region. If even one of the conditions deviates from the established range, then the state is judged in step 715 as outside of the diagnosis region. The idle range may also be set as the diagnosis region.

Figure 8:
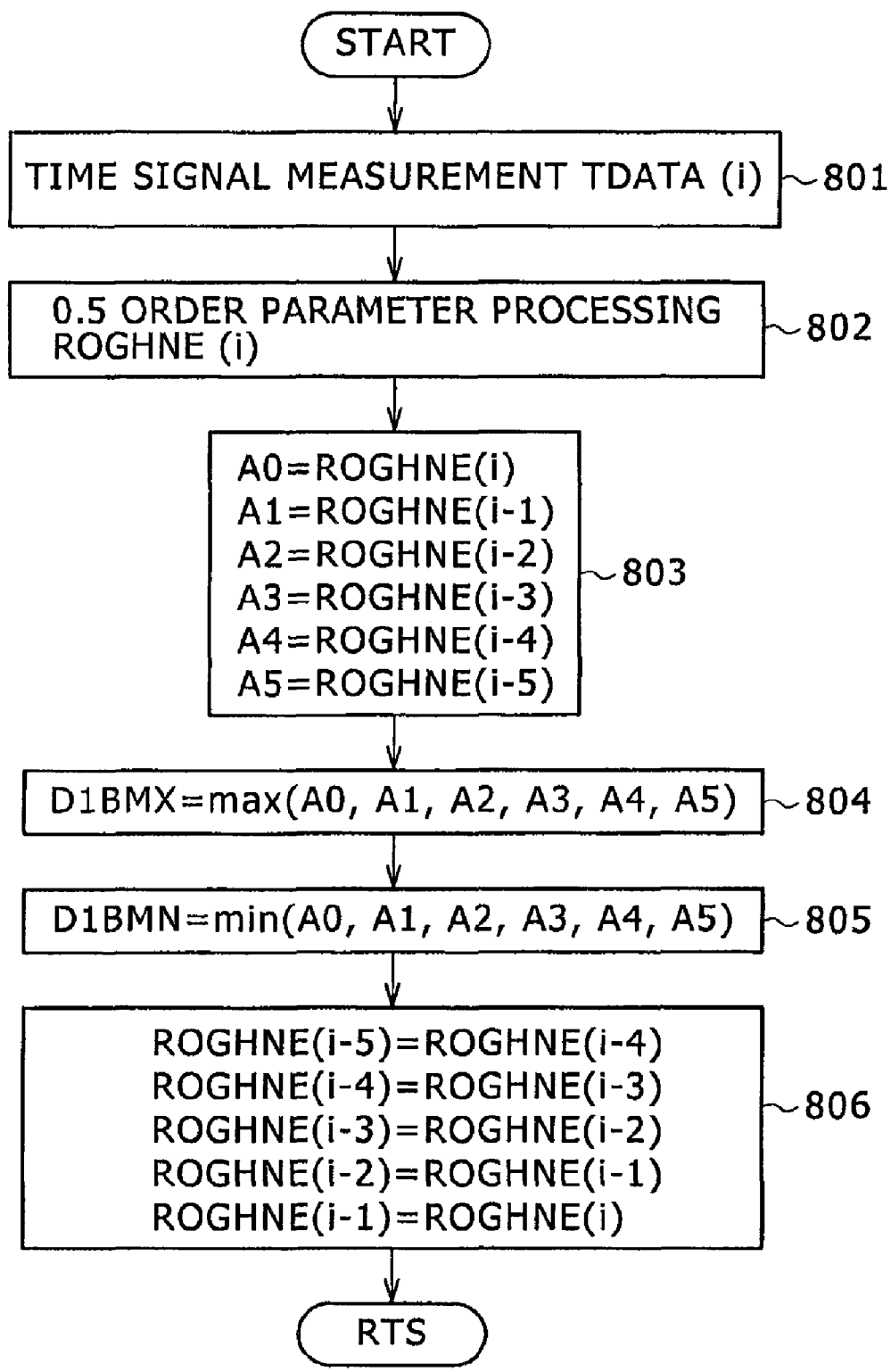
FIG. 8 is a flow chart provided to describe the diagnosis technique of this embodiment.

The processing for calculating the 0.5 order parameter ROGHNE from the time signal as shown in the flow chart of FIG. 8 is described next. This process starts with the spark plug firing (ignition). In step 801, the time (required time) TDATA needed for the crankshaft to rotate to the specified angle is measured. In step 802, the 0.5 order parameter ROGHNE is calculated according to formula (1) based on the measured time TDATA. In step 803, the past six calculated 0.5 order parameters ROGHNE are stored in the memory. In step 804, the maximum value among the past six 0.5 order parameters ROGHNE is set as D1BMX. In step 805, the minimum value among the past six 0.5 order parameters ROGHNE is set as D1BMN. In step 806, the past values for the past six ROGHNE 0.5 order parameters ROGHNE are shifted in order to perform the next calculation. The steps 803 through 806 are utilized in order to calculate the 0.5 order parameter peak ROGHNE.

Figure 9:
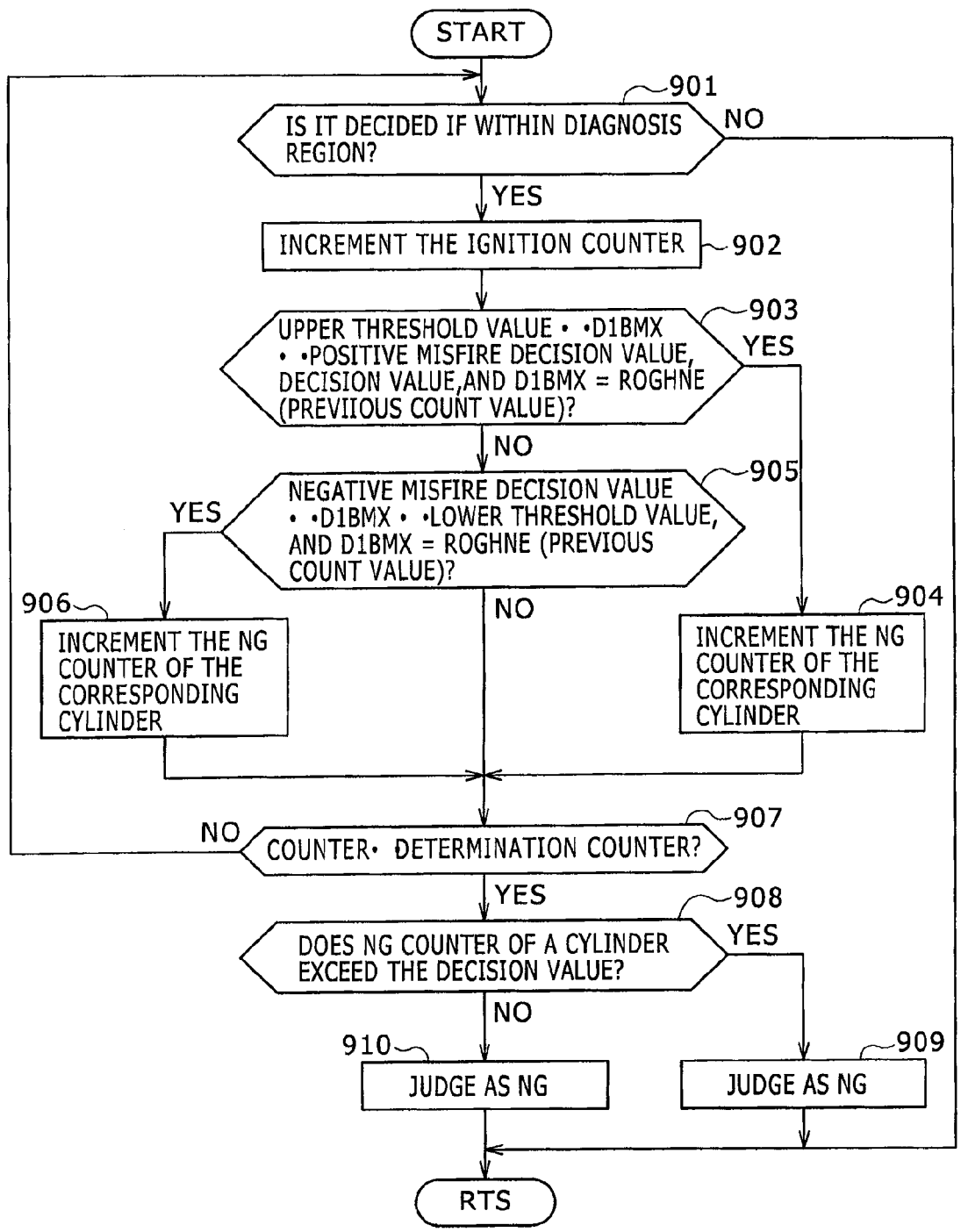
FIG. 9 is a flowchart provided to describe the diagnosis technique of this embodiment.

The flow chart in FIG. 9 is described next. This flow chart corresponds to the main section of the diagnosis. In step 901 a check is made to determine if the state is within the diagnosis region. If within the diagnosis region, then the processing from step 902 onward is executed. If outside the diagnosis region 901, then no processing is performed. The processing if within the diagnosis region is described next. In step 902, the ignition (plug firing) counter is incremented in order to count the number of ignitions. If the following condition 1 is satisfied, then in step 903 a decision is made that the 0.5 order parameter ROGHNE exceeded the upper threshold value, and a positive peak occurred. The processing in step 904 is then executed.

Upper threshold value≦D1BMX≦positive misfire decision value   Condition 1

Moreover, D1BMX=the previous ROGHNE value

In step 904, the NG counter of the corresponding cylinder is incremented. A detailed description is given later on using FIG. 10. If the following condition 2 is established (satisfied) in step 905, while condition 1 is not established in step 903, then the 0.5 order parameter ROGHNE dropped below the lower threshold value, and detection of a negative peak is judged. The processing in step 906 is executed.

Negative misfire decision value≦D1BMN≦lower threshold value   Condition 2

Moreover, D1BMN=the previous ROGHNE value

In step 906, the NG counter of the corresponding cylinder is incremented. A detailed description is given later on using FIG. 11. Next, in step 907, if the ignition counter does not reach the decision count, then the processing is once more repeated from step 901. If the misfire counter reaches the decision count in step 907, then a check is made in step 908 to find whether the NG counter for each cylinder exceeded the decision value. If the decision value was exceeded then an NG is decided in step 909. If the decision value was not exceeded then an OK decision is made in step 910. A detailed description is given later on using FIG. 12.

Figure 10:
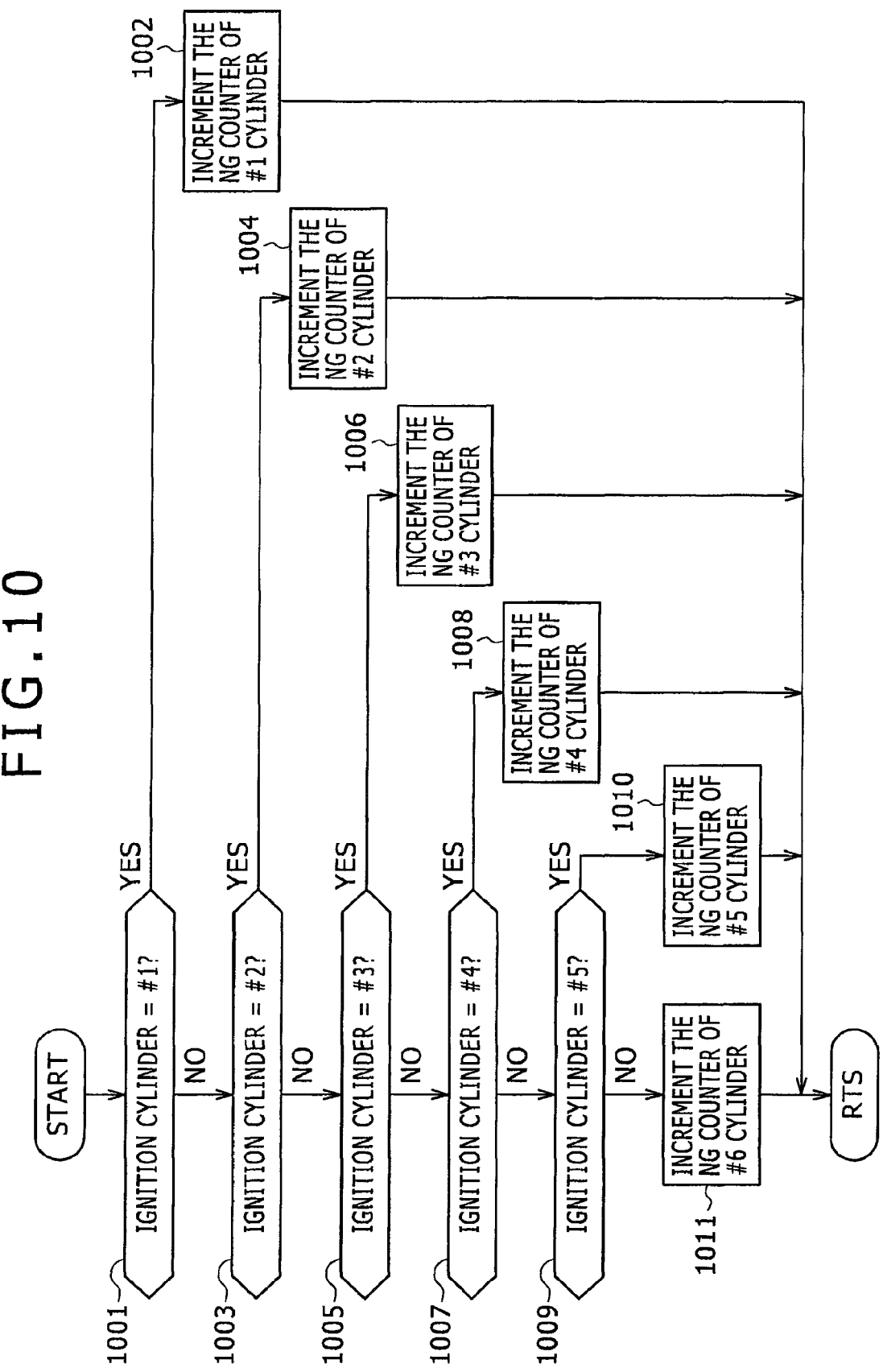
FIG. 10 is a flow chart for showing in detail step 904 of FIG. 9.

FIG. 10 is a flow chart showing the processing in step 904 in detail. In step 1001, if the ignition (in combustion stroke) cylinder is the #1 cylinder, then the NG counter of the #1 cylinder is incremented in step 1002. In step 1003, if the ignition cylinder is the #2 cylinder, then the NG counter of the #2 cylinder is incremented in step 1004. In step 1005, if the ignition cylinder is the #3 cylinder, then the NG counter of the #2 cylinder is incremented in step 1006. In step 1007, if the ignition cylinder is the #4 cylinder, then the NG counter of the #4 cylinder is incremented in step 1008. In step 1009, if the ignition cylinder is the #5 cylinder, then the NG counter of the #5 cylinder is incremented in step 1010. If other than the above cylinders, then the NG counter of the #6 cylinder is incremented in step 1011.

Figure 11:
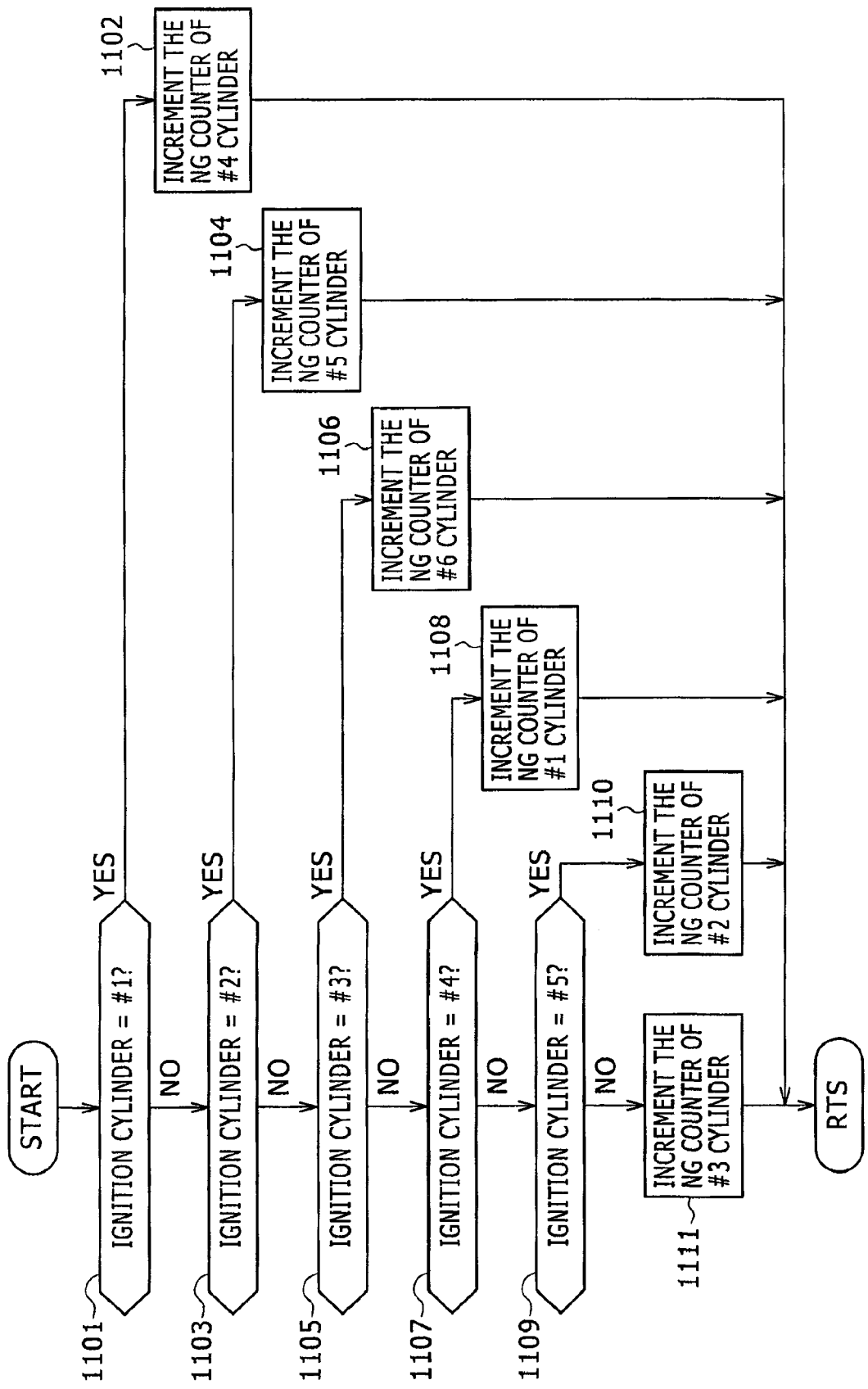
FIG. 11 is a flow chart for showing in detail step 906 of FIG. 9.

FIG. 11 is a flow chart showing step 906 in detail. In step 1101, if the ignition cylinder is the #1 cylinder, then the NG counter for the #4 cylinder is incremented in step 1102. In step 1103, if the ignition cylinder is the #2 cylinder, then the NG counter on the #5 cylinder is incremented in step 1104. In step 1105, if the ignition cylinder is the #3 cylinder, then the NG counter on the #6 cylinder is incremented in step 1106. In step 1107, if the ignition cylinder is the #4 cylinder, then the NG counter on the #1 cylinder is incremented in step 1108. In step 1109, if the ignition cylinder is the #5 cylinder, then the NG counter on the #2 cylinder is incremented in step 1110. In cases other than above, the NG counter on the #3 cylinder is incremented in step 1111.

Figure 12:
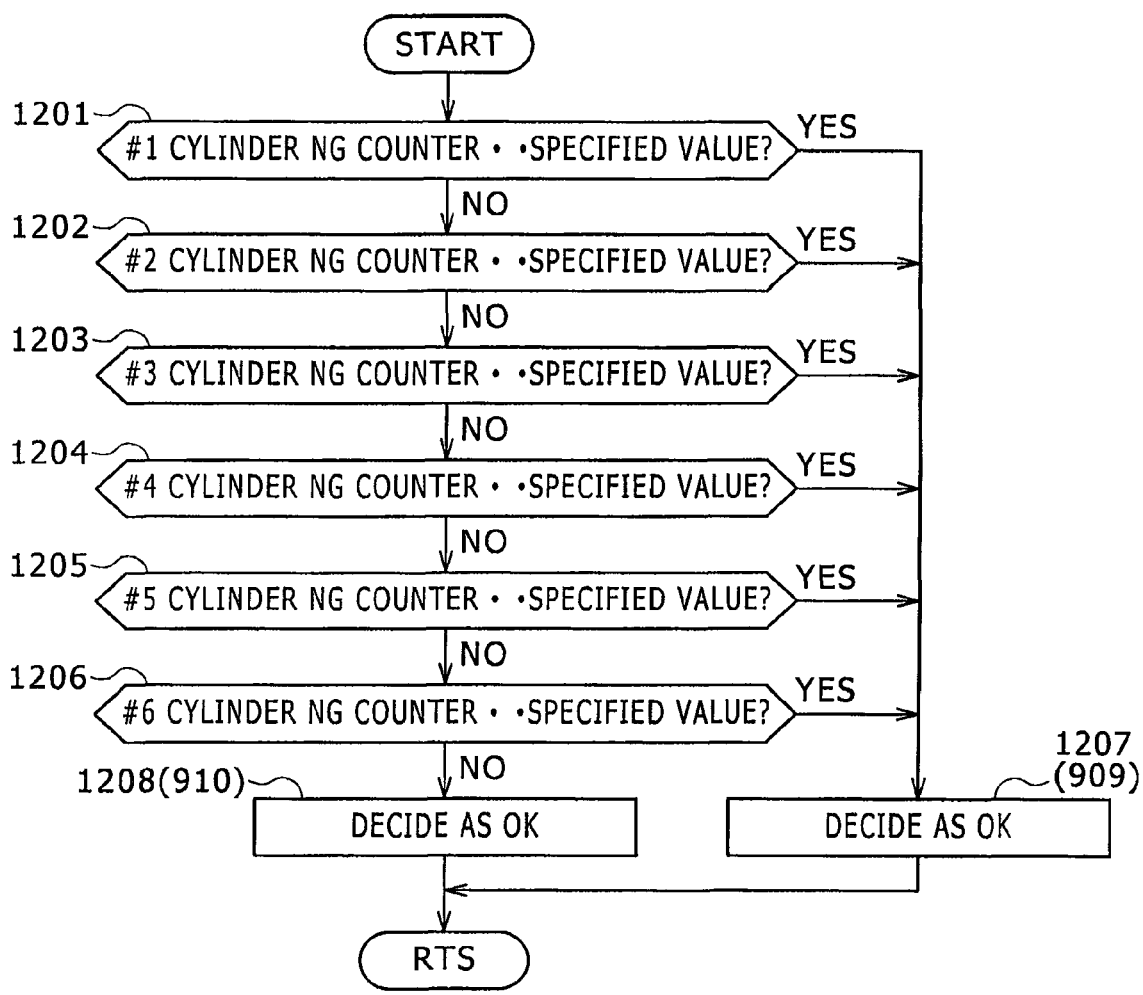
FIG. 12 is a flow chart for showing in detail step 907 of FIG. 9.

FIG. 12 is a flow chart showing step 908 in detail. In step 1201, a check is made to find if the NG counter of the #1 cylinder is larger than the specified value. In step 1202, a check is made to find if the NG counter of the #2 cylinder is larger than the specified value. In step 1203, a check is made to find if the NG counter of the #3 cylinder is larger than the specified value. In step 1204, a check is made to find if the NG counter of the #4 cylinder is larger than the specified value. In step 1205, a check is made to find if the NG counter of the #5 cylinder is larger than the specified value. In step 1206, a check is made to find if the NG counter of the #6 cylinder is larger than a specified value. If any of the conditions in 1201 through 1206 are established (NG counter is larger than specified value) then an NG decision is made in step 1207 (909). If none of the conditions in steps 1201 through 1206 are established, then an OK decision is made in step 1208 (910).

The process in the diagnosis flow chart of this embodiment was described above.

Figure 13:
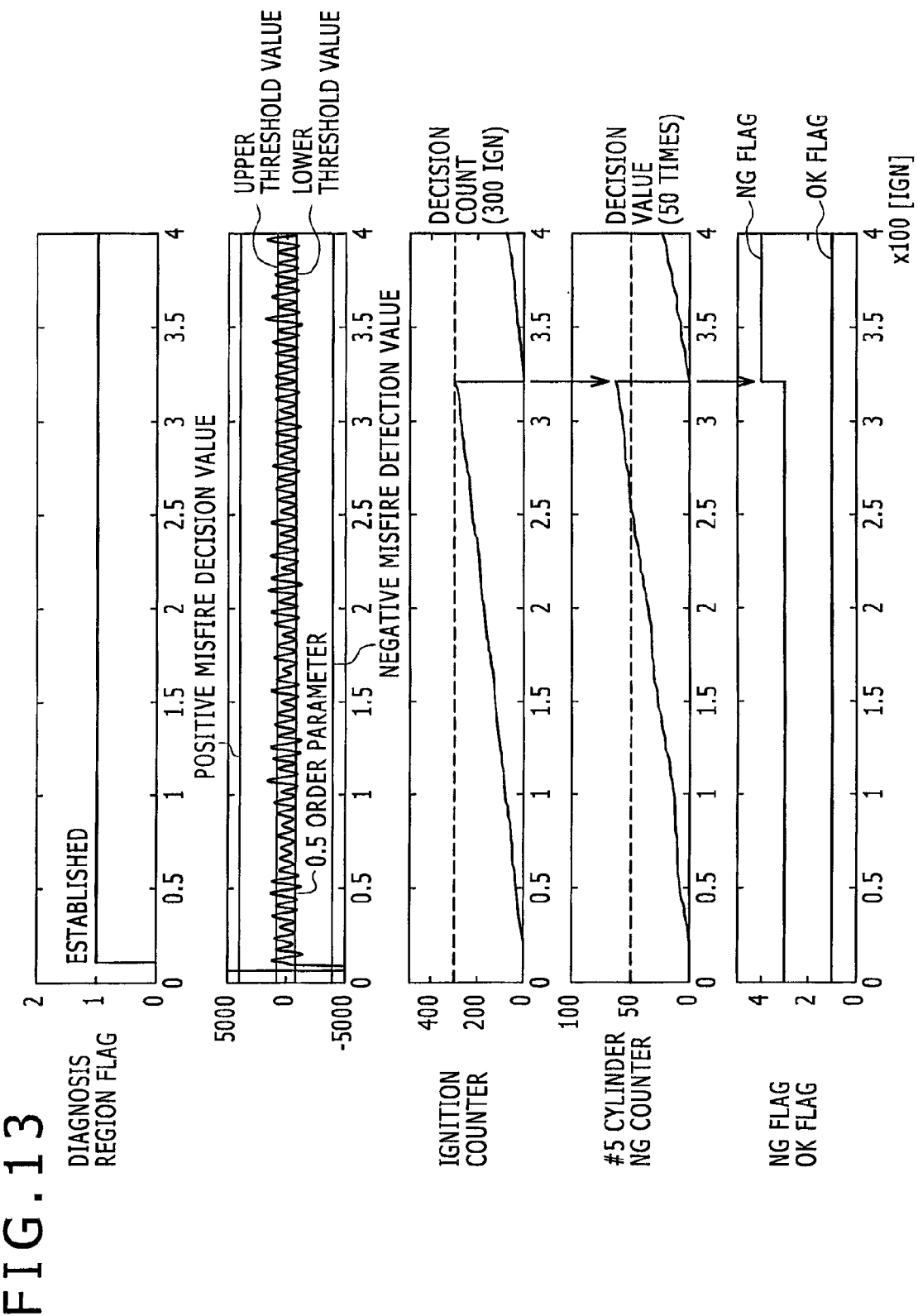
FIG. 13 is a drawing showing results of a test performed to verify the efficacy of this invention (when fuel to the #5 cylinder was increased 40%)
Figure 14:
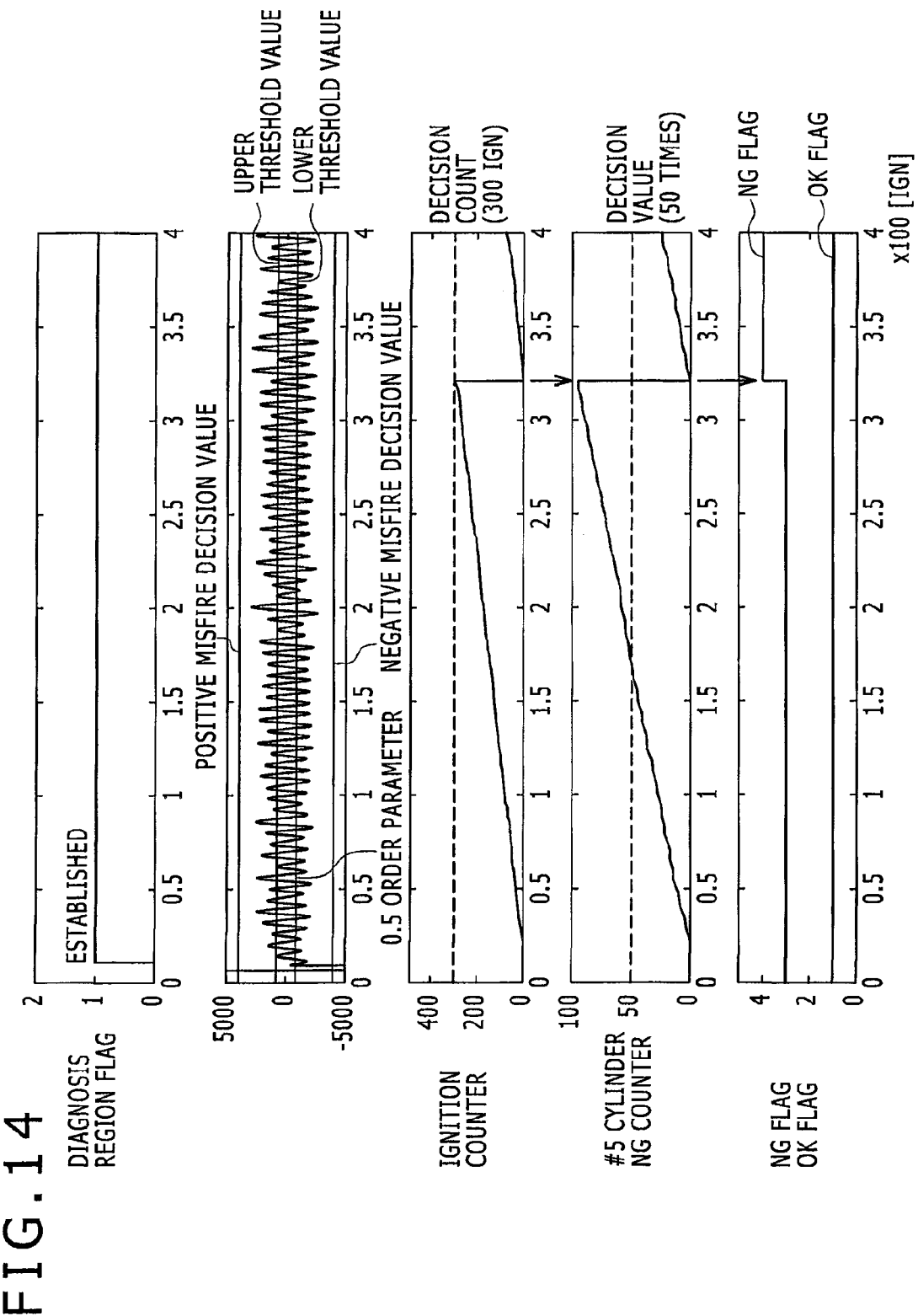
FIG. 14 is a drawing showing results of a test performed to verify the efficacy of this invention (when fuel to the #5 cylinder was increased 20%)
Figure 15:
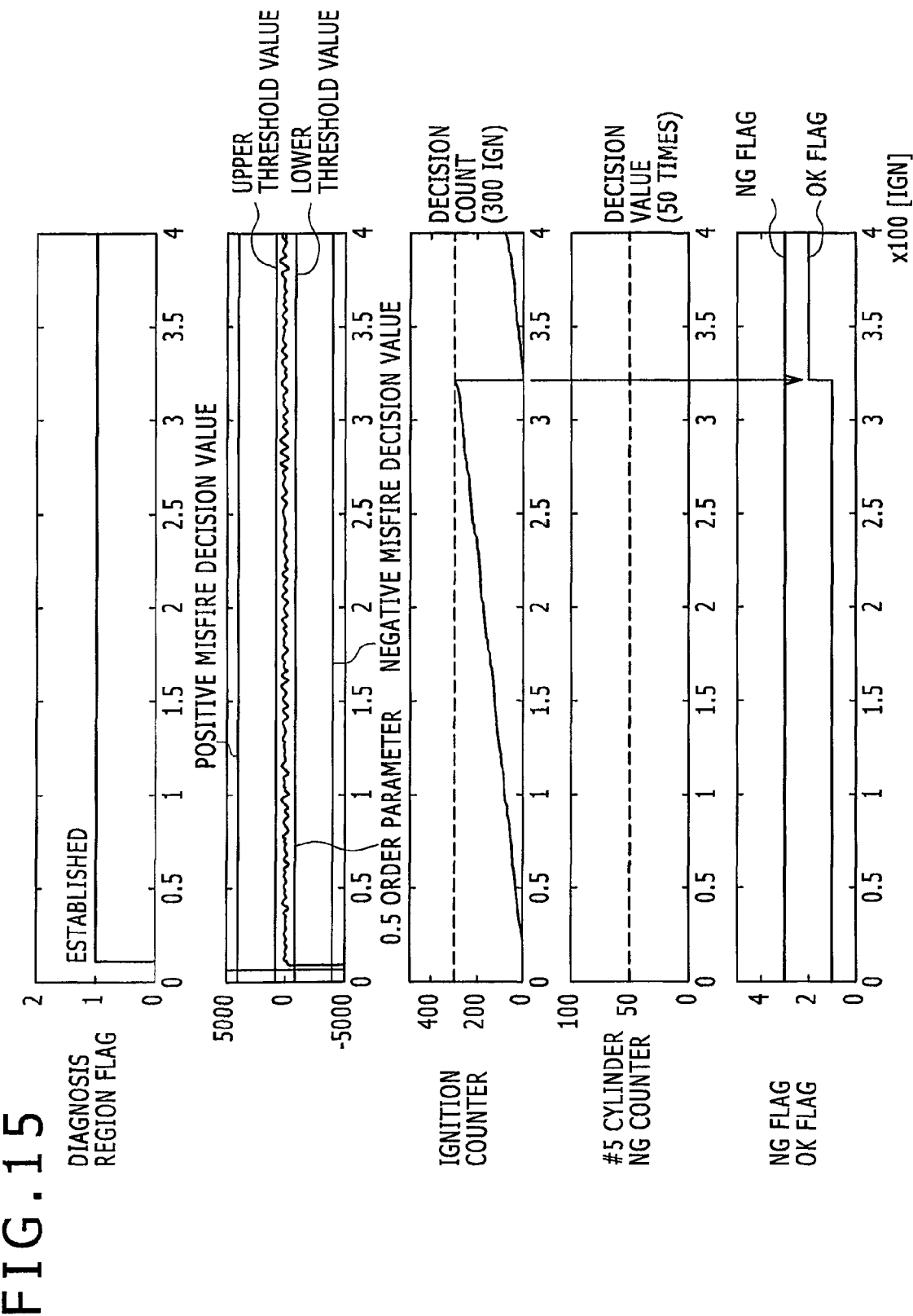
FIG. 15 is a drawing showing results of a test performed to verify the efficacy of this invention (during normal operation).

The capability to diagnose the presence and extent of air/fuel ratio variations in the cylinders according to the diagnosis flow chart was checked. The test results are shown in FIG. 13 through FIG. 15. FIG. 13 shows results from increasing the fuel injection quantity in the #5 cylinder 40 percent to cause a variation in the air/fuel ratio in the cylinders. Examining the figure reveals that the NG counter of the #5 cylinder is counting upwards (NG counters on other cylinders are not counting up so are omitted). The decision is made at the point where the diagnosis region is set and the ignition counter reached the decision count 300IGN. The decision value is set to 50 times, and an NG flag is set when the NG counter of the #5 cylinder is larger than 50 times. The NG state is in this way decided to have occurred.

FIG. 14 shows results from decreasing the fuel injection quantity in the #5 cylinder 20 percent to cause a variation in the air/fuel ratio in the cylinders. Examining the figure reveals that the NG counter of the #5 cylinder is counting upwards (NG counters on other cylinders are not counting up so are omitted). A decision is made when the diagnosis region is set and the ignition counter reached the decision count 300IGN. The decision value is set to 50 times, and an NG flag is set when the NG counter of the #5 cylinder is larger than 50 times. The NG state is in this way decided to have occurred.

FIG. 15 shows results during the normal state. Examining the figure reveals that the NG counter of the #5 cylinder is not counting upwards (NG counters on other cylinders are also not counting upwards) The decision is made at the point where the diagnosis region-is set and the ignition counter reached the decision count 300IGN. The decision value is set to 50 times, and an OK flag is set when the NG counter of the #5 cylinder is 50 times or less (the same for other NG counters). The OK state is in this way decided to have occurred.

The method of this embodiment makes a diagnosis for both positive and negative 0.5 order parameters. However in other aspects a diagnosis can be made for only the positive or only the negative. If making a diagnosis for only the positive side then step 805 in FIG. 8 is not needed, steps 905 and 906 of FIG. 9 are not needed, and FIG. 11 is not needed. If making a diagnosis for only the negative side then step 804 in FIG. 8 is not needed, steps 903, 904 of FIG. 9 are not needed, and FIG. 10 is not needed.

This invention is capable of accurately diagnosing the presence and extent of air/fuel ratio variations in engine cylinders, even when the system has no part or mode for detecting the air/fuel ratio in the cylinders.

This invention is also capable of checking the validity of the detection results even in systems containing a part or mode for detecting the air/fuel ratio in the cylinders, and the method of this invention can improve the accuracy for detecting variations in the air/fuel ratio in cylinders.

The method of this invention indirectly detects variations in the air/fuel ratio in cylinders from the time signal found from measuring the time signal for the time required for the crankshaft to reach the specified rotation angle at each cylinder during an air/fuel variation in the cylinders. However, the properties of the method of this invention also allow diagnosing the presence and extent not only of variations in the output of each cylinder, but also variations in the variable valve timing, variations in the lift quantity, and variations in the compression ratio, etc.

What is claimed is:

1. A diagnostic control apparatus for internal combustion engines that controls the fuel injection quantity to each cylinder and also diagnoses the presence and extent of variations in the air/fuel ratio or output in engine cylinders, wherein the diagnostic control apparatus measures the time required for the crankshaft to rotate to a specified angle for each cylinder; and along with deriving the 0.5 order component as the rotation fluctuation component for each two rotations of the crankshaft per each cylinder or the 1.0 order component as the rotation fluctuation component for each single rotation of the crankshaft based on the measured, required time; also makes a count of the number of times that the 0.5 order component or 1.0 order component deviated from the preset range in the period set for each cylinder; and diagnoses that an error has occurred in the output or in the air/fuel ratio for a particular cylinder when the count exceeds a specified value.

2. A diagnostic control apparatus for internal combustion engines that controls the fuel injection quantity to each cylinder and also diagnoses the presence and extent of variations in at least one among the valve timing, valve lift quantity and compression ratio of the cylinders, wherein the diagnostic control apparatus measures the time required for the crankshaft to rotate to a specified angle for each cylinder; and along with deriving the 0.5 order component as the rotation fluctuation component for each two rotations of the crankshaft per each cylinder or the 1.0 order component as the rotation fluctuation component for each single rotation of the crankshaft based on this measured, required time; also makes a count of the number of times that the 0.5 order component or 1.0 order component deviates from the preset range in the period set for each cylinder; and when the applicable count values exceeds a specified value, diagnoses that at least one error has occurred among the valve timing, valve lift quantity and compression ratio for that cylinder.

3. A diagnostic control apparatus for internal combustion engines that controls the fuel injection quantity to each cylinder and also diagnoses the presence and extent of variations in the air/fuel ratio or output in engine cylinders, the diagnostic control apparatus comprising:

an output measurement estimator part to measure and estimate the output or the physical quantity correlating to that output in each cylinder;

a cylinder discriminator part to decide which cylinder is at what stroke;

a cylinder variation parameter processor part to process variation parameters in the cylinders based on the output from each cylinder or its correlating physical quantity as measured and estimated by the output measurement estimator part;

a cylinder variation counter processor approval decision part to decide whether or not to approve the cylinder variation counter processing;

a cylinder variation counter processor part to process the cylinder variation counter based on the decision results of the cylinder discriminator part and processing results from the cylinder variation parameter processor part and decision results from the cylinder variation counter processor approval decision part;

a cylinder variation decision approval part to decide whether or not to approve the cylinder variation decision based on decision results from the cylinder variation counter processor approval decision part; and an cylinder variation detector decision part to detect and decide on the presence and extent of variations in output or the air/fuel ratio in the cylinders based on processing results from the cylinder variation counter processor part, as well as decision results from the cylinder variation decision approval part.

4. The diagnostic control apparatus for internal combustion engines according to claim 3, wherein the cylinder discriminator part decides which cylinder is at the ignition-combustion stroke based on the signal obtained from the sensor that detects the rotation and phase of the crankshaft and/or rotation member that rotates in synchronization with the crankshaft.

5. The diagnostic control apparatus for internal combustion engines according to claim 3, wherein the cylinder variation counter processor approval decision part approves the counter processing when: the engine rotations (rpm) are within the specified range, the load is within the specified range, the engine cooling fluid temperature is within the specified range, the vehicle speed is within the specified range, the air intake temperature is within the specified range, the atmospheric pressure is the specified value or higher, the battery voltage is within the specified range, the non-fuel cutoff state is set, the air/fuel ratio feedback control is in-progress, the air/fuel ratio correction factor is within the specified range, the canister purge quantity is within the specified value or lower, no fluctuations occurs in the external electrical load, and the sensor is not broken.

6. The diagnostic control apparatus for internal combustion engines according to claim 3, wherein the cylinder variation counter processor approval decision part approves the counter processing when in the idle state.

7. The diagnostic control apparatus for internal combustion engines according to claim 3, wherein the cylinder variation decision approval part measures the ignition combustion count or the elapsed time in the period where the cylinder variation counter processor approval decision part has approved the processing.

8. The diagnostic control apparatus for internal combustion engines according to claim 7, wherein when the count value for the output or air/fuel ratio for each cylinder counted by the cylinder variation counter processing part has become larger than the specified value; the cylinder variation detector decision part decides there is an error in the output or the air/fuel ratio of the cylinders with a larger count, when the ignition combustion count reached a specified value, or when the elapsed time reached a specified time.

9. The diagnostic control apparatus for internal combustion engines according to claim 3, wherein the output measurement estimator part measures the time required for the crankshaft to rotate to a specified angle for each cylinder as a physical quantity correlating to the output, and estimates each cylinder output based on the measured, required time.

10. The diagnostic control apparatus for internal combustion engines according to claim 9, wherein the cylinder variation parameter processor part detects the 0.5 order component as the rotation fluctuation component for each two rotations of the crankshaft, based on the required time measured by the output measurement estimator part.

11. The diagnostic control apparatus for internal combustion engines according to claim 10, wherein the cylinder variation counter processor part sets the upper threshold value and the lower threshold value for the 0.5 order component, and also counts the number of times that the 0.5 order component exceeded the upper threshold value or dropped below the lower threshold value in each cylinder, according to decision results from the cylinder discriminator part.

12. The diagnostic control apparatus for internal combustion engines according to claim 11, wherein the cylinder variation counter processor part sets the upper threshold and lower threshold values based on the engine rotation (rpm) and the load.

13. The diagnostic control apparatus for internal combustion engines according to claim 9, wherein the cylinder variation parameter processor part detects the 1.0 order component as the rotation fluctuation component for each single rotation of the crankshaft, based on the required time measured by the output measurement estimator part.

14. The diagnostic control apparatus for internal combustion engines according to claim 13, wherein the cylinder variation counter processor part sets the upper threshold value and the lower threshold value for the 1.0 order component, and also counts the number of times that the 1.0 order component exceeded the upper threshold value or dropped below the lower threshold value in each cylinder, according to decision results from the cylinder discriminator part.

15. The diagnostic control apparatus for internal combustion engines according to claim 14, wherein the cylinder variation counter processor part sets the upper threshold and lower threshold values based on the engine rotation (rpm) and the load.

\* \* \* \* \*